Sept. 13, 1960 D. N. MacDONALD ET AL 2,952,844

DIGITAL TO ANALOG CONVERTER

Filed Sept. 17, 1956 5 Sheets-Sheet 1

INVENTORS.
DUNCAN N. MAC DONALD
HARRY E. BURKE, JR.

BY

Christie, Parker & Hale
ATTORNEYS

Sept. 13, 1960 D. N. MacDONALD ET AL 2,952,844

DIGITAL TO ANALOG CONVERTER

Filed Sept. 17, 1956 5 Sheets-Sheet 2

INVENTORS
DUNCAN N. MAC DONALD
HARRY E. BURKE, JR

BY

Christie, Parker & Hale

ATTORNEYS

INVENTORS.
DUNCAN N. MAC DONALD
HARRY E. BURKE, JR.
BY
Christie, Parker & Hale
ATTORNEYS INVENTORS.
DUNCAN N. MAC DONALD
HARRY E. BURKE, JR.
BY
Christie, Parker & Hale
ATTORNEYS INVENTORS.
DUNCAN N. MAC DONALD
HARRY E. BURKE, JR.
BY
Christie, Parker & Hale
ATTORNEYS 2,952,844

DIGITAL TO ANALOG CONVERTER

Duncan N. MacDonald, Arcadia, and Harry E. Burke, Jr., Sierra Madre, Calif., assignors, by mesne assignments, to Consolidated Electrodynamics Corporation, Pasadena, Calif., a corporation of California Filed Sept. 17, 1956, Ser. No. 610,356

4 Claims. (Cl. 340—347)

This application relates to an improved digital to analog converter, and more particularly, to improved apparatus for generating an electrical signal corresponding to numerical information. It is a continuation-in-part of our application Serial No. 487,884, filed February 14, 1955.

In data processing systems, it is well known to generate digital signals corresponding to a variable so that the data may be subjected to a series of computations in a digital computer, or the like. While data processing equipment which operates in accordance with digital signals is extremely accurate and useful, it will be appreciated that the relationship between variables represented in digital or numerical form is difficult for an observer to assimilate.

The usual way in which such information is displayed in a readily understandable manner is by means of a graphical illustration. However, ordinarily, the digital values must be plotted laboriously point by point in order to construct such a graphical illustration. In contrast, where electrical signals are available which change as a function of a variable, automatic servomechanism graph plotters may be used to produce a graphical illustration. Consequently, the need has arisen for a converter which will provide electrical signals which are suitable for driving a graph plotter in accordance with digital values.

The apparatus of the invention provides for the generation of voltages corresponding to digital values which may be used for controlling an automatic graph plotter or for other purposes.

In accordance with our invention, a digital to analog converter is provided in which at least one stepping switch is caused to assume a position corresponding to a digital value, and a voltage generating device is connected to the stepping switch to generate a voltage corresponding to the digital value.

In a preferred embodiment of the invention, each of a plurality of stepping switches is energized to represent a significant digit of a multiple digit number, and an attenuator circuit is connected to each of the stepping switches by means of which a voltage is generated corresponding to the multiple digit number.

Where our invention is to be used in connection with an automatic graph plotter, we have found that a set of stepping switches may be assigned to the X-axis input of the graph plotter and another set of stepping switches assigned to the Y-axis input of the graph plotter. By stepping each of these switches so that the positions of the X-axis set correspond to a multiple digit number of one variable, and stepping the Y-axis set to positions corresponding to a multiple digit number of another variable, voltages may be generated for causing an automatic graph plotter to plot a point corresponding to the variables represented by the multiple digit numbers.

A better understanding of our invention will be had upon a reading of the following specification and an inspection of the drawings, in which.

Figures 1, 5:
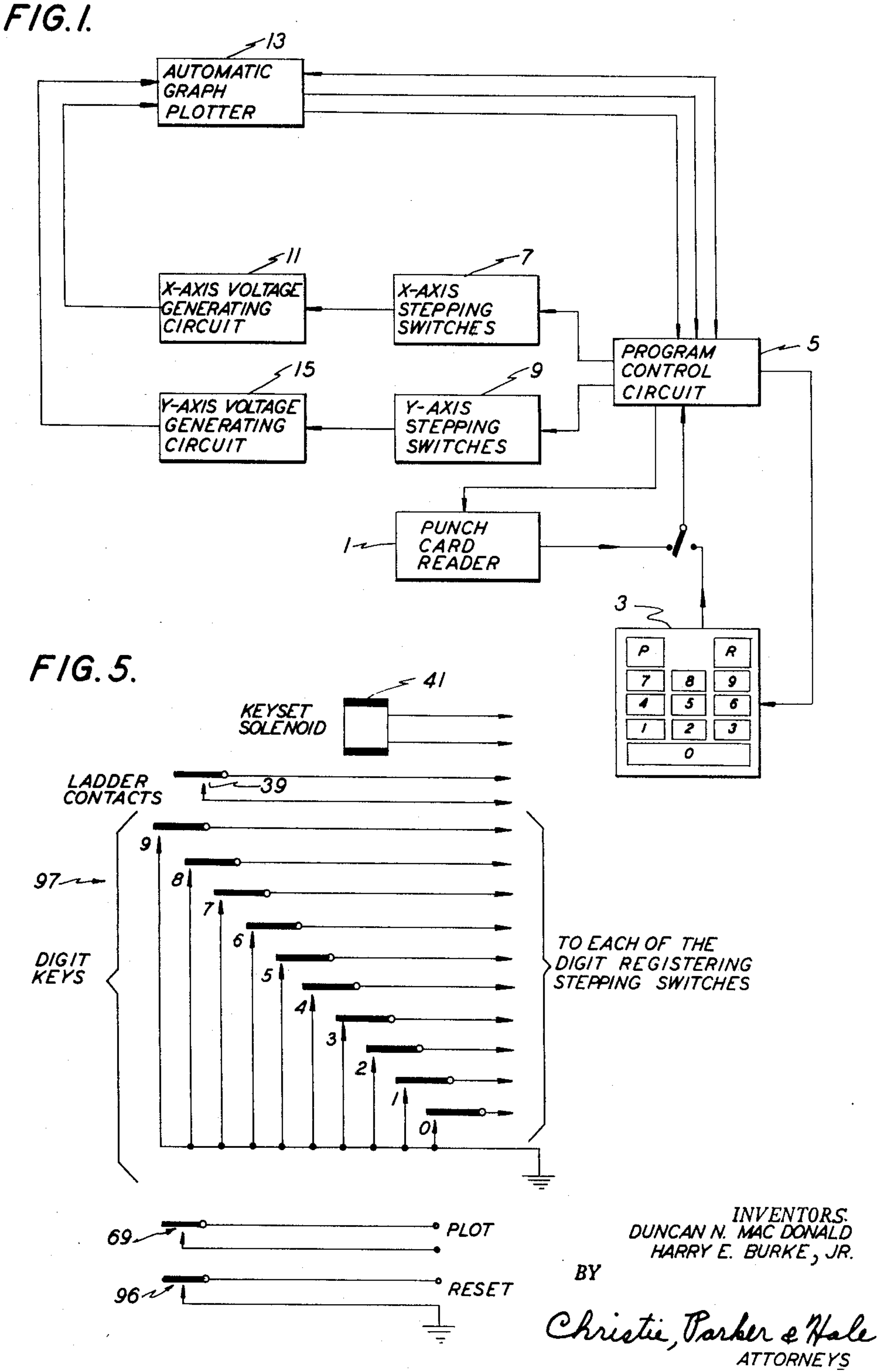
Fig. 1 is a block diagram illustrating one embodiment of our invention which is adapted to be used in conjunction with a graph plotter.
Fig. 5 is a circuit diagram of a set of keyboard contact closures which may be used in connection with the embodiment of our invention shown in Figs. 2 and 3.

In Fig. 1 there is shown an embodiment of our invention which is adapted to receive digital signals from a perforated card reader 1, or from a manual keyboard 3. The card reader is preferably of the type described in more detail in Patent No. 2,275,396 and is described herein in more detail in connection with Fig. 4. Digital signals from the selected source are applied to a program control circuit 5.

In turn, the program control circuit 5 energizes a plurality of stepping switches which, in the embodiment of Fig. 1, comprise the X-axis stepping switches 7 and the Y-axis stepping switches 9. The program control circuit causes each of the stepping switches to assume a position corresponding to a digital signal from the selected digital signal source. In the case of the manual keyboard 3 the stepping switches are stepped into position sequentially so that the significant digits of the X-axis multiple digit number are entered one by one and subsequently the Y-axis stepping switches are positioned in like manner.

Connected to the X-axis stepping switches 7 is an X-axis voltage generating circuit 11 which provides an output voltage corresponding to the multiple digit number registered by the X-axis stepping switches 7. The voltage generated by the X-axis voltage generating circuit 11 may be applied to the X-axis input of an automatic graph plotter 13 which may be of a type described in Patent No. 2,727,308. In like manner, a Y-axis voltage generating circuit 15 generates a Y-axis voltage corresponding to the multiple digit number represented by the Y-axis stepping switches 9. The Y-axis voltage may be applied to the Y-axis input of the graph plotter 13. The graph plotter 13 includes servo motors and control means therefor for driving a pen in two coordinates, with electrical means for engaging and disengaging the pen from the plotting surface.

When the X-axis stepping switches 7 and the Y-axis stepping switches 9 have been positioned to represent the coordinates of a point to be plotted, the program control circuit 5 energizes the plot motors in the graph plotter 13 and the graph plotter plots a point corresponding to the voltages supplied by the Y-axis voltage generating circuit 11 and the Y-axis voltage generating circuit 15. Thus, a series of digital values may be plotted one by one to provide a readily understandable graphical illustration of the relation between the digital values.

Figure 2:
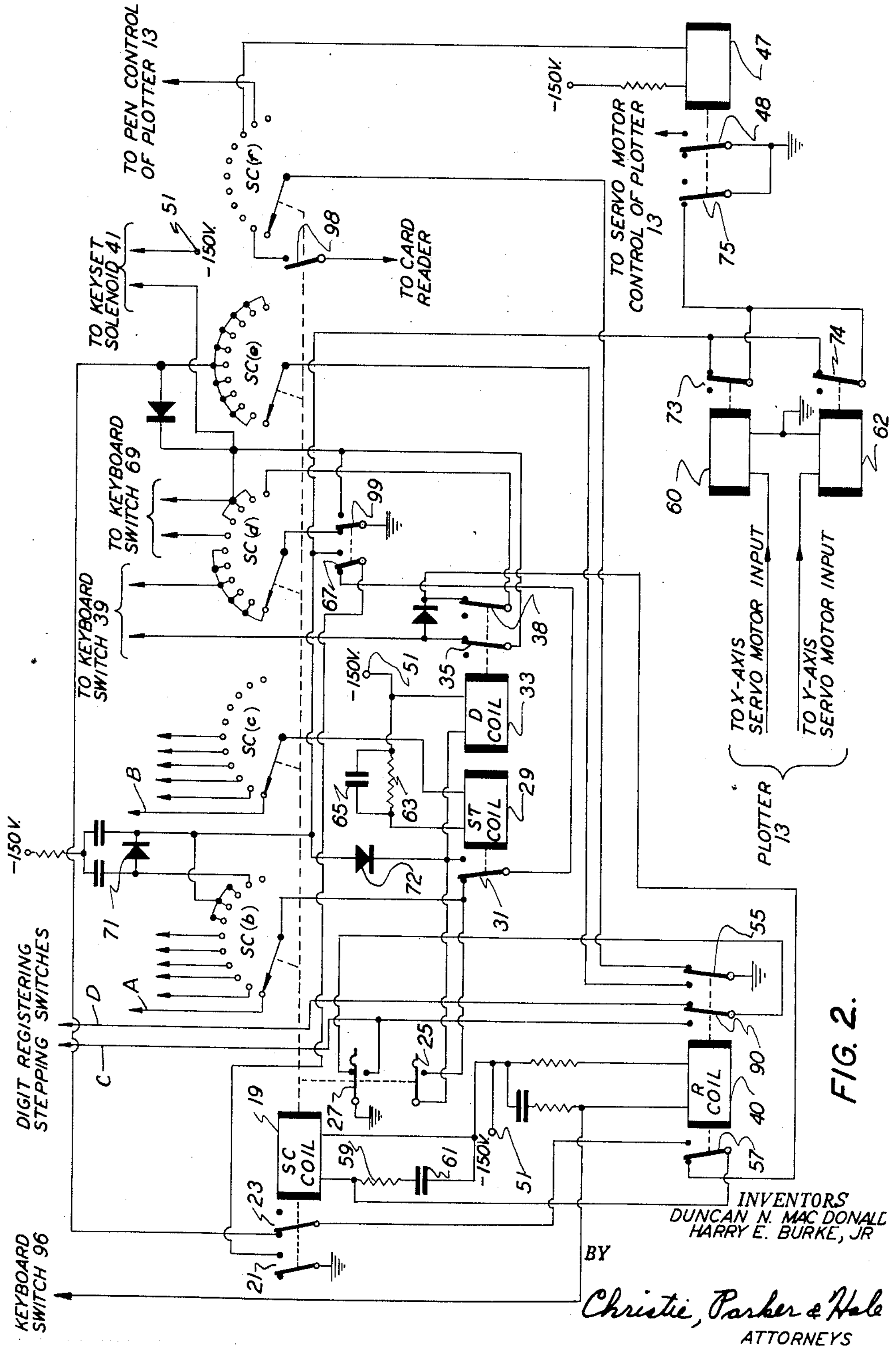
Fig. 2 is a schematic circuit diagram illustrating the program control circuitry used in one embodiment of our invention.
Figure 7:
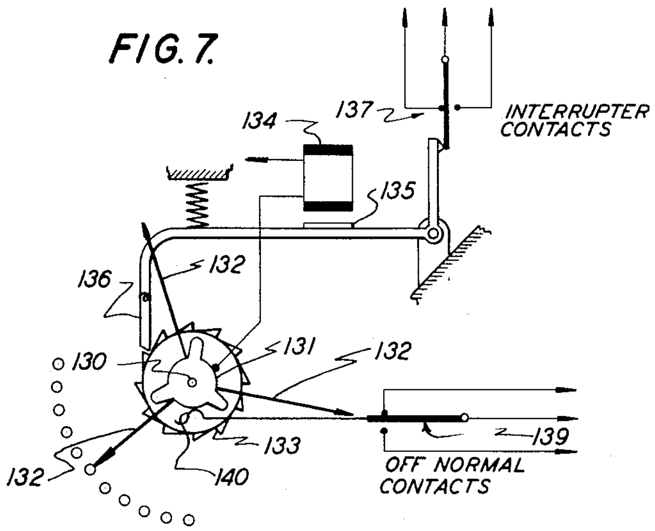
Fig. 7 is a circuit diagram of a stepping switch which may be used in the embodiment of Figs. 2 and 3.

Referring to Fig. 2, a schematic circuit diagram of one type of program control circuit is shown. The apparatus of Fig. 2 includes a scanning (SC) stepping switch including an energizing coil (SC coil) 19, a normally open switch 21, a normally closed switch 23, a pair of normally open off-normal contacts 25, a set of off-normal contacts 27 forming a single pole double-throw switch and five synchronously operated bays, SC(*b*), SC(*c*), SC(*d*), SC(*e*), and SC(*f*), each of which includes eleven contacts and a contactor arm. A suitable stepping switch is shown in Fig. 7.

In addition, Fig. 2 includes a stop (ST) relay having a coil (ST coil) 29 and contacts forming a single pole double-throw switch 31. In addition, there is included in Fig. 2 a delay (D) relay having a coil (D coil) 33, which when energized opens the normally closed switch 35 and the normally closed switch 38.

All of the relay coils shown in Fig. 2 are adapted to be energized from a source of direct current. For this purpose a suitable power supply having a negative output voltage of 150 volts may be applied to the power input terminals indicated at 51.

Figure 3:
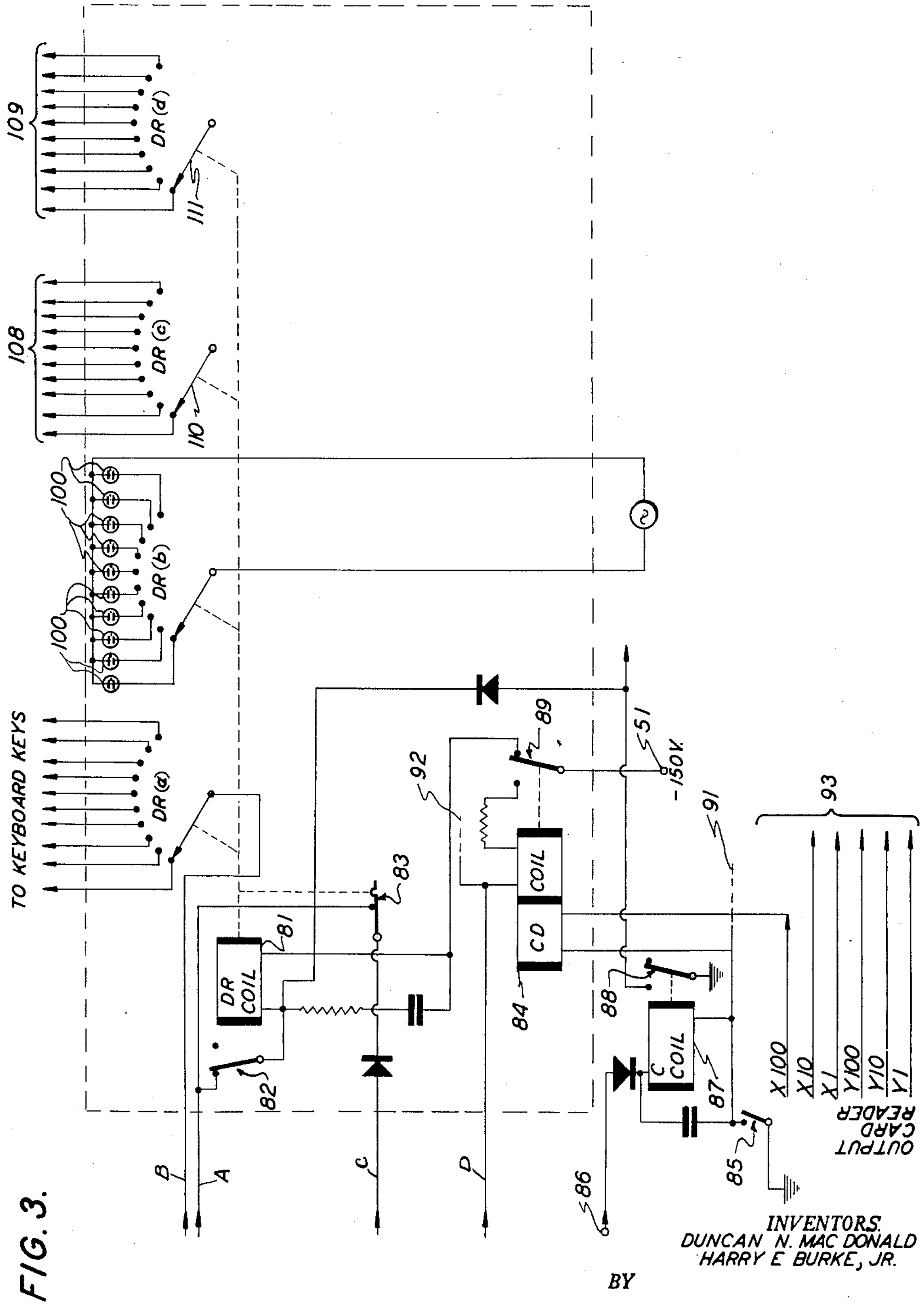
Fig. 3 is a schematic circuit diagram of one type of stepping switch and its associated circuitry which may be used in an embodiment of our invention.

When digital information is introduced from the manual keyboard 3, digit after digit, the first six positions of the scanning stepping switch (SC) are adapted to energize each of six stepping switches, indicated generally at 7 and 9 and shown in more detail in Fig. 3, in sequence, so that the energized stepping switches each assume a position corresponding to a significant digit of a multiple digit number.

In general, the various bays of the scanning stepping switch (SC) perform the following functions: SC(*b*) controls the energization of the digit registering stepping switches 7 and 9; SC(*c*) controls the portion of the circuit which senses the condition when each of the energized digit registering stepping switches registers the selected digits; SC(*d*) is concerned with the programming of the operations of the scanning stepping switch (SC); SC(*e*) completes a circuit for resetting the scanning stepping switch (SC); and SC(*f*) controls the operation of the plotting motors of the graph plotter 13 and the card advance of the punched card reader 1.

A reset relay having an energizing coil (R coil) 40 causes the scanning stepping switch SC to step into position "1." When the R coil 40 is energized by a reset switch 96 on the keyboard (see Fig. 5) a switch 55 connects the contactor arm associated with bay SC(*e*) to ground potential. If the scanning stepping switch is in any other position but position "1" (counting the contact terminals from left to right) a circuit is completed from the power input terminal 51 through the SC coil 19, a switch 57 associated with the reset relay, the switch 23, bay SC(*e*) and its contactor arm, and the switch 55. This actuates the scanning stepping switch, but as is well known in a conventional type of stepping switch, the contactor arms do not change position until the coil is de-energized. However, when the SC coil 19 is energized, the switch 23 associated with the scanning stepping switch opens, thereby de-energizing the SC coil 19 and causing the stepping switch to step to the next position. The type of circuit in which a coil is energized and de-energized automatically via a set of contacts associated therewith is sometimes termed a buzzer circuit, since it is similar to circuits used in sound-producing buzzers.

The SC coil 19 continues to be energized and de-energized alternately, thereby stepping the contactor arms through position "11" to position "1," at which time a circuit is no longer complete through bay SC(*e*) and the scanning stepping switch comes to rest. In order to limit the inductive surge across the SC coil 19 and to limit sparking across the various contacts, a spark suppression circuit including a resistor 59 and a capacitor 61 may be connected in series across the SC coil 19.

Each of the first six contacts of bay SC(*b*) of the scanning stepping switch is connected respectively to a separate digit registering stepping switch (DR), one of which is shown in Fig. 3. Assuming that the scanning stepping switch (SC) is in position "1," thereby energizing the most significant digit registering stepping switch (DR) associated with the XR axis, a digit entered into the manual keyboard, as shown in Fig. 5, will complete a circuit to ground potential from a selected one of the contacts of bay DR(*a*) of the digit registering stepping switch. The digit registering stepping switch (Fig. 3) is caused to step through its cycle until it reaches a position in which the contactor arm makes connection with the grounded contact of bay DR(*a*). Interconnection between the circuits of Fig. 2 and Fig. 3 are indicated by the capital letters A, B, C, and D.

Since the contactor arm of the digit registering stepping switch (DR) is connected to the position "1" contact of bay SC(*c*) of the program control circuit of Fig. 2, the ST coil 29 of the stop relay will be energized via the terminal 51, thereby sensing the correct position of the digit value registering stepping switch. A resistor 63 and a capacitor 65 may be included to provide an initial surge which insures fast operation of the stop relay.

When the ST coil 29 is energized, the switch 31 completes a circuit from the terminal 51 through the D coil 33, and a switch 67 to the normally open switch 21 associated with the SC coil 19. The switch 21 will be closed at this time since the SC coil 19 is energized via the contactor arm of the bay SC(*d*), a set of ladder contacts 39 in the keyboard, as shown in Fig. 5, which were closed when the digit was entered in the keyboard, and the reset switch 57.

In addition, the closing of the ladder contacts 39 energizes a keyset solenoid 41 which acts to lock all the keys in the keyboard until it is de-energized. However, when the D coil 33 is energized, the D coil switches 35 and 38 open, thereby interrupting the circuit to the keyset solenoid 41, which when de-energized releases the keyboard. Consequently, the depressed key on the keyboard is released and the contacts 39 thereby interrupt the circuit to the SC coil 19. As the SC coil 19 is de-energized, the scanning stepping switch steps to position "2," thereby energizing the next digit registering stepping switch via bay SC(*b*).

In a manner similar to that previously described, when the next successive digit is entered in the keyboard, the second significant digit registering stepping switch steps to the selected digital position where the ST coil 29 is energized, the D coil 33 is energized, and the SC coil 19 is de-energized, thereby causing the scanning stepping switch to step into position "3."

This action continues for each successive digit until all six of the digit registering stepping switches are positioned and the scanning stepping switch steps into position "7." The scanning stepping switch rests in position "7" until a plot key is depressed which closes a set of contacts 69 in the keyboard (see Fig. 5). When the scanning stepping switch is in position "7," and the plot key is depressed, the SC coil 19 is energized via the contactor arm of bay SC(*d*), the position "7" contact of SC(*d*), the plot key contacts 69, the D relay contacts 35, and the R relay contacts 57.

In position "7" when the SC coil 19 is energized, the D coil 33 is energized via the switch 21 of the scanning switch, the switch 67, the switch 31, the contactor arm of bay SC(*b*) and a pair of diodes 71 and 72. This opens the D relay contacts 35, thereby de-energizing the SC coil 19 which causes the scanning stepping switch to step to position "8."

In position "8" the circuit is completed to a motor control relay coil 47 via bay SC(*f*) of the scanning stepping switch. As is described below, this closes a switch 48 which completes a circuit to activate the graph plotter 13.

In addition, a pair of relays (the coils of which are indicated at 60 and 62), may be connected to the graph plotter in such a way that a switch 73 is closed by the relay 60 until the graph plotter assumes the correct position for the X-axis and the switch 74 is closed by the relay 62 until the graph plotter assumes a position corresponding to the proper Y-axis position. The relays may be actuated in response to the voltages applied to the respective servo motors in the plotter 13, which voltages go to zero when the pen is properly positioned. A switch 75 may be associated with the motor control relay coil 47 to be closed when the scanning circuit stepping switch is in position "9."

The switches 73 and 74 function to hold the D coil 33 energized until graph plotter 13 is ready to accept the instruction to plot a point. When the graph plotter is ready, the contacts 73 and 74 are opened by the respective relays 60 and 62. The D coil 33 is de-energized, the SC coil 19 is energized, the D coil 33 is again energized, and the scanning circuit stepping switch steps to position "10."

In position "10" a circuit is completed via bay SC($f$) of the scanning circuit stepping switch which engages the pen with the recording surface in the plotter 13, causing the graph plotter to plot the point. In position "10" the SC coil 19 is again energized via the stepping switch bay SC($d$), the D relay switch 35, and the reset relay switch 57. When the D coil 33 is again energized, the SC coil 19 is de-energized, and the scanning circuit stepping switch steps to position "11."

In position "11" the SC coil 19 is energized via the 11th contact of bay SC($d$) and the D relay switch 38. The scanning circuit stepping switch remains in position "11" until the reset relay is energized which causes the SC coil 19 to be energized via bay SC($e$) as discussed above in connection with the reset operation.

Thus, where the program control circuit of Fig. 2 is employed to energize a plurality of stepping switches for registering digits which are successively entered by means of a manual keyboard, the stepping switches are energized in turn via bay SC($b$), the stop coil 29 is energized via bay SC($c$) whenever the energized stepping switch is in proper position, the bay SC($d$) provides for the control of the stepping of the program control stepping switch, bay SC($e$) causes the scanning circuit stepping switch to step to position "1" whenever the reset relay is energized, and the motor control relay coil 47 and the pen control associated with the graph plotter are energized via bay SC($f$).

Considering the apparatus of Fig. 3 in detail, the digit registering stepping switch DR coil 81 is energized from a suitable source of negative potential applied to the terminal 51. The set of off-normal contacts 27 forming a part of the scanning stepping switch of Fig. 2 operates to complete a circuit to ground through the DR coil 81 when the scanning stepping switch is in a selected position. This causes the digit registering stepping switch to be stepped through its cycle until it reaches home position. When the DR coil 81 is initially energized an interrupter switch 82 associated therewith opens, thereby de-energizing the DR coil and causing the stepping switch to step into its next position.

This action repeats itself until a set of off-normal contacts 83 associated with the DR coil 81 open to indicate that the digit registering stepping switch has assumed position "1." Assuming that the digit registering stepping switch (DR) and the scanning circuit stepping switch (SC) are in the "1" position, the apparatus is ready for the introduction of digital information. A circuit is completed through the DR coil 81 via the interrupter switch 82 to ground through bay SC($b$) of the scanning circuit of Fig. 2. As a result, the DR coil 81 is alternately energized and de-energized until such time as the contactor arm associated with bay DR($a$) of the digit registering stepping switch (DR) connects with a grounded contact. The grounded connection energizes the ST coil 29 of Fig. 2, which in turn causes the scanning circuit stepping switch (SC) to step to position "2," thereby leaving the digit registering stepping switch of Fig. 3 in a position corresponding to the digital value entered.

Another digit registering stepping switch similar to that of Fig. 3 may be connected to the second terminals of bays SC($b$) and SC($c$) of Fig. 2 so that the next significant digit may be entered. Thus, the operation where digits are entered from a keyboard is such that each of a plurality of digit value registering stepping switches is energized in turn. Bays (DR($c$) and DR($d$) of the digit registering stepping switch of Fig. 3 are concerned with the generation of an analog voltage corresponding to the digital value. The manner in which these bays and their contacts may be connected to generate such an analog voltage will be described in detail in connection with Fig. 6.

Bay DR($b$) of the digit value registering stepping switch may be devoted to energizing indicator lights 100 for each of the positions of the digit value registering stepping switch.

Information may be entered into the digital converter of Figs. 2 and 3 from perforated cards as well as from a manual keyboard. The conventional perforated card reader is arranged to read the information simultaneously from all of the eighty columns on a standard punch card a row at a time. Consequently, it is desirable to arrange the apparatus so that all the digit value registering stepping switches may be energized and positioned simultaneously. Therefore, the circuitry outside of the dashed block of Fig. 3 may be connected to a plurality of digit registering stepping switches for entering information which is derived from a perforated card in what might be termed "time parallel." Only six columns are actually used since this is all the digits required within the accuracy of the plotter 13.

Figure 4:
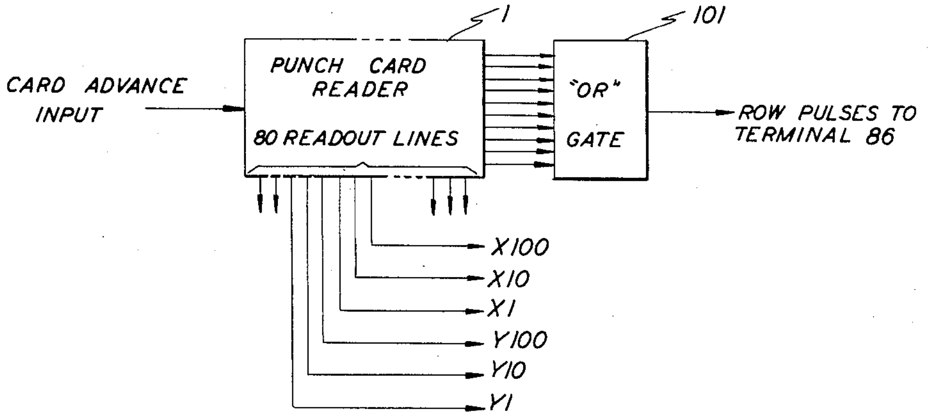
Fig. 4 is a more detailed block diagram of the punch card reader and associated circuitry.

Assuming that the digit value registering stepping switch of Fig. 3 is to register the hundreds significant digits (X100) of the X-axis multiple digit number, a connection from the perforated card reader, as shown in Fig. 4, may be made between the X100 significant digit reading brush and a card digit (CD) relay coil 84. In addition, a manual switch 85 is closed to enter digital information from perforated cards.

At the beginning of the operation, the stepping switch of Fig. 3 is in the "1" position. However, as each row on the perforated card is advanced by the card reader, a row pulse is generated by the card reader, the row pulses being coupled through an "or" gate 101 and applied to the terminal 86. This energizes a clock relay coil (C coil) 87 which in turn closes a normally open switch 88, thereby energizing the digit registering relay coil (DR coil) 81. This causes the digit registering stepping switch to prepare to step to the next position. When the row pulse applied to the terminal 86 ceases, the C coil 87 is de-energized, the switch 85 open, the DR coil 81 is de-energized, and the digit registering stepping switch steps to the next position. This action continues until such time as a digit pulse resulting from a punch in the particular column appears on the X100 lead, thereby energizing the CD coil 84 of the card digit relay. This opens the circuit to the DR coil 81 by means of the contacts 89, so that the digit registering stepping switch remains in its previous position even though succeeding row pulses are applied to the terminal 86.

It will be noted that the potential applied to the terminal 51 is applied to a second coil which acts as a lockup on the card digit registering relay of the CD coil 84. Thus, the digit value registering stepping switch of Fig. 3 steps in sequence with clock pulses applied to the terminal 86, until such time as a digit value pulse appears to lock the digit registering stepping switch into position. Consequently, the position of the digit registering stepping switch indicates the digital value derived from the perforated card.

After a complete card has been read, and all of the digit registering stepping switches are in position, the apparatus of Fig. 2 may be used to cause an automatic graph plotter to plot a point in the manner above described.

The operation of the apparatus of Fig. 2, when information is being entered from a perforated card reader, is substantially similar to that described above with respect to the operation when information is being entered from a manual keyboard. However, where it is desired to make the operation fully automatic, a single pole double-throw switch 99 may be interconnected to the card reading equipment in such a way that when information is to be read from a card, the switch 99 functions to bypass the contact arm and contacts of bay SC(*d*). Thus, a circuit is completed from the terminal 51 through the SC coil 19, switch 57, switch 35 and switch 99 to ground. In addition, the single pole double-throw switch 67 is arranged to bypass the contactor arm and contacts of bay SC(*b*) when information is to be entered from perforated cards. Thus, by means of the single pole double-throw switches 67 and 99, the apparatus of Fig. 2 may be stepped continuously through its cycle. Therefore, by causing the single pole double-throw switches 67 and 99 to be actuated whenever a complete card has been read, and all of the digit value registering stepping switches are in position, the scanning stepping switch of Fig. 2 may be stepped through its cycle.

When the scanning stepping switch is stepped to position "2," the card reader is actuated by closing a switch 98 associated with the perforated card reader and bay SC(*f*) to start the next card through the reader. The scanning stepping switch continues through its cycle with the motor control coil 47 and the pen control of the plotter 13 being energized as described above.

When it is desired to reset the digit registering stepping switch of Fig. 3 to 0, a set of reset contacts 90 operated by the reset coil 40 may be used to interrupt the circuit from the lockup position of the CD coil 84. Or alternatively, where automatic operation is desired, off-normal contacts 27 associated with the scanning circuit stepping switch may be employed to reset the digit value registering stepping switch. The dashed leads 91 and 92 indicate that additional digit registering stepping switches may be connected in a manner similar to the X100 digit registering stepping switch of Fig. 3. Likewise, each of the leads indicated generally by the number 93 may be applied to a separate digit value registering stepping switch for entering information from a perforated card.

Fig. 5 shows a circuit diagram of one suitable type of keyboard for use in connection with the apparatus of Figs. 2 and 3. The keyset solenoid 41 and the ladder contacts 39 operate in the manner heretofore indicated.

A set of contacts 96 may be included in the keyboard for energizing the R coil 40 shown in Fig. 2, which in turn operates the reset relay switches 55 and 57 of Fig. 2. Any conventional type of keyset contact closure may be used for the digit keys indicated generally by the numeral 97. The digit contact closures have a common return to ground reference potential. The other side of each of the digit contact closures is connected to one of the terminals of bay DR(*a*) of the digit value registering stepping switch of Fig. 3. By connecting similar bays of all of the digit value registering relays in parallel, each of the digit value registering stepping switches may be sequentially stepped to a position corresponding to the digital value as discussed above in connection with the operation of Figs. 2 and 3.

Figure 6:
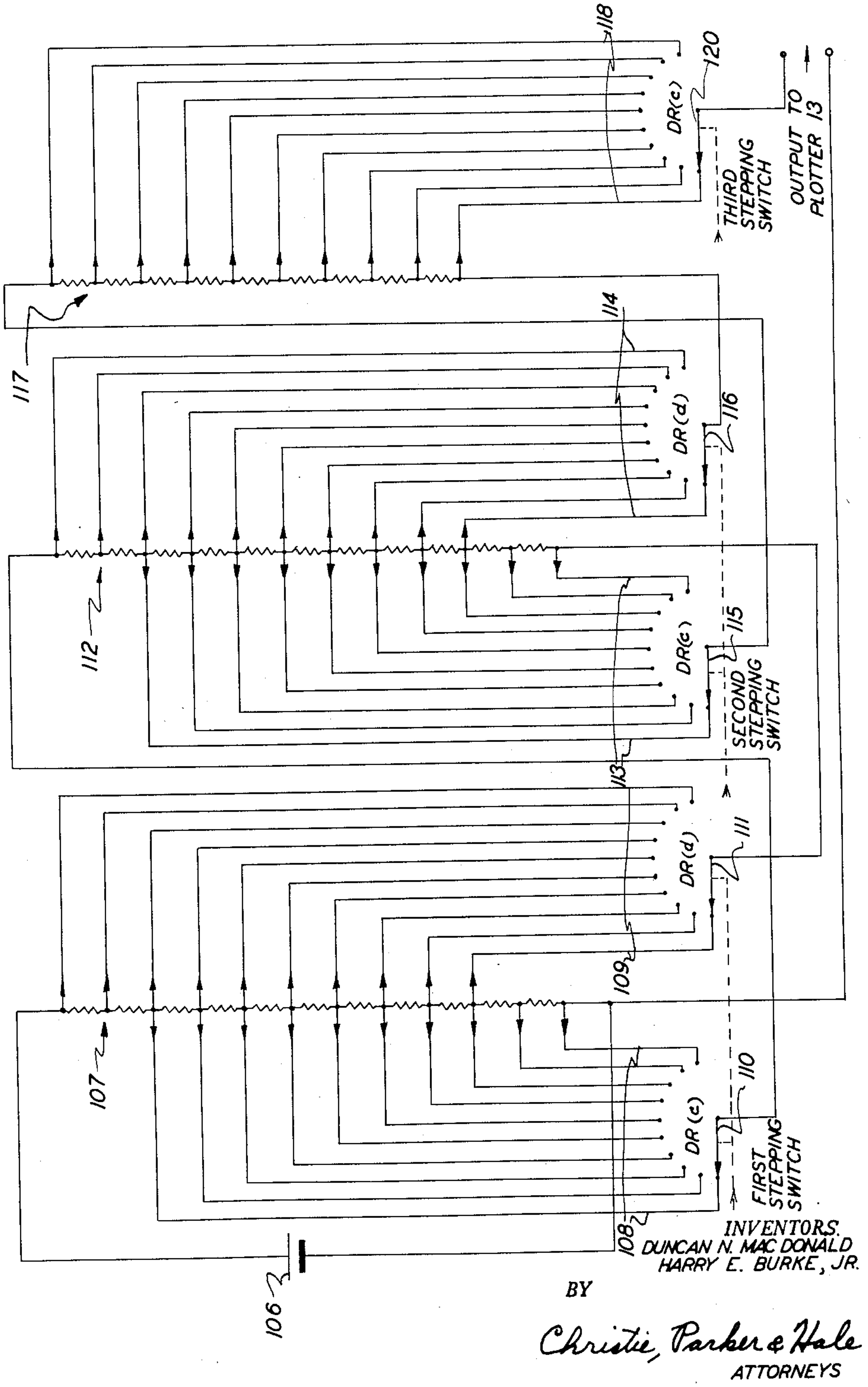
Fig. 6 is a circuit diagram showing one type of potentiometer attenuator which may be connected to the stepping switch shown in Fig. 3 for generating a voltage.

In Fig. 6 there is shown one type of conventional potentiometer attenuator known as a Thompson-Varley potentiometer, which may be used in connection with a plurality of digit value registering stepping switches, such as that shown in Fig. 3, for generating an analog voltage corresponding to a digital value represented by the positions of each of the stepping switches.

In Fig. 6 a standard cell 106 is connected across a voltage divider 107 comprising eleven serially connected resistors. The voltage divider is connected to the contacts of bay DR(*c*) of the digit registering stepping switch of Fig. 3 and the contacts of bay DR(*d*) of the same digit registering stepping switch. In effect, the connection is such that the contactor arm 110 and the contactor arm 111 connect to the voltage divider 107 at junction points which are removed from each other by one unconnected junction point.

By this means the voltage between the contactor arms 110 and 111 is the same as the voltage drop across two resistors between the junction points to which the contactor arms 110 and 111 are connected.

The voltage appearing across the voltage divider 107 is applied to the second voltage divider 112 consisting of eleven serially connected resistors to which is connected the bay DR(*c*) and DR(*d*) of another digit registering stepping switch which is adapted to respond to the second significant digit of a multiple digit number.

The voltage appearing across the voltage divider 112 is in turn applied to a third voltage divider 117 consisting of ten serially connected resistors to which is connected a third digit registering stepping switch. The voltage appearing between the contactor arm 120 of the bay DR(*c*) of the last stepping switch and the terminal 121 represents the sum of the voltages representing the digits of a multiple digit number.

In this type of attenuator, the total resistance of the voltage divider 107 should be five times that of the voltage divider 112 of the next section, which in turn should have a resistance which is five times that of the last voltage divider 117. Thus, if the resistance of the voltage divider 117 is designated R, the resistance of the voltage divider 112 should be 5R, and the resistance of the voltage divider 107 should be 25R.

The circuit shown in Fig. 6 is suitable for generating one voltage for driving an automatic graph plotter in response to the positioning of three digit value registering stepping switches. Thus, where the apparatus is to be used in a manner similar to that shown in Fig. 1, two potentiometer attenuators as shown in Fig. 6 may be employed; one for use in generating the X-axis voltage; and one for generating the Y-axis voltage.

In Fig. 7 there is shown diagrammatically one type of stepping switch which may be employed for the digit value registering stepping switch of Figs. 2 and 3. The stepping switch of Fig. 7 includes a shaft 130, to which is attached a cam 131, the contactor or wiper arms 132, and a ratchet disk 133.

In operation, the coil 134 is energized, thereby lifting the armature 135, to which is attached a pawl 136. The armature 135, when drawn towards the coil 134, actuates a set of interrupter contacts 137. When the coil 134 is de-energized, the contacts 137 are returned to their normal position, the pawl 136 is released and engages the ratchet disk 133, thereby moving the contactor arms 132 to the next position. The function of the cam 131 is to actuate the off-normal contacts 139.

It will be noted that in one contact position the cam 131 engages the cam follower 140, thereby actuating the off-normal contacts 139. In conventional stepping switches the cam 131 may be positioned to actuate the off-normal contacts in any selected position. As was noted in the discussion of the scanning stepping switch of Fig. 2, the off-normal contacts 25 and 27 are actuated when the scanning circuit stepping switch is in position "11." Likewise, with respect to the digit value registering stepping switch, the off-normal contacts 83 are energized in position "1."

Although specific circuitry has been shown for one embodiment of the invention which may be used in connection with an automatic graph plotter, it will be appreciated that such circuitry is given by way of example only. Modifications of the illustrative embodiment will readily occur to those skilled in the art to adapt the invention for other uses.

We claim:

1. Apparatus for converting information from a punch card reading device which senses the punches in separate columns on the card a row at a time, the card reader producing a pulse as each row is sensed and producing a separate output pulse for each column in which a punch is sensed in a given row, said apparatus comprising a plurality of stepping switches, means for stepping said switches in response to the row indicative pulses from the card reader, means for interrupting respectively each of said stepping switches in response to a punch indicative pulse from a corresponding one of the column outputs of the card reader, means for deriving a voltage in response to each of said stepping switches indicative of the position of the corresponding stepping switch, the changes in voltage with each step of any respective pair of stepping switches activated in response to pulses derived from punches in adjacent columns being related in the ratio of an integral multiple of ten, and means for summing the voltages derived by means of the respective stepping switches for producing an analog voltage indicative of the setting of the stepping switches by the punch card.

2. Apparatus for converting information from a punch card reading device which senses the punches in separate columns on the card a row at a time, the card reader producing a pulse as each row is sensed and producing a separate output pulse for each column in which a punch is sensed in a given row, said apparatus comprising a plurality of stepping switches, means for stepping said switches in response to the row indicative pulses from the card reader, means for interrupting respectively each of said stepping switches in response to a punch indicative pulse from a corresponding one of the column outputs of the card reader, means for deriving a voltage in response to each of said stepping switches indicative of the position of the corresponding stepping switch, the changes in voltage with each step of the respective stepping switches being related in ratios of an integral multiple of ten, and means for summing the voltages derived by means of the respective stepping switches for producing an analog voltage indicative of the setting of the stepping switches by the punch card.

3. Apparatus for converting information from a punch card reading device which senses the punches in separate columns on the card a row at a time, the card reader producing a pulse as each row is sensed and producing a separate output pulse for each column in which a punch is sensed in a given row, said apparatus comprising a plurality of electrically operated stepping switches, means for stepping said switches in response to the row indicative pulses from the card reader, means for interrupting respectively each of said stepping switches in response to a punch indicative pulse from a corresponding one of the column outputs of the card reader, means for deriving a voltage in response to each of said stepping switches indicative of the position of the corresponding stepping switch, and means for summing the voltages derived by means of the respective stepping switches for producing an analog voltage indicative of the setting of the stepping switches by the punch card.

4. Apparatus as defined in claim 3 wherein said means for stepping the relays includes a clock relay actuated by each of the row pulses having a normally open switch, and the means for interrupting each of the stepping relays includes a plurality of relays each having a lockup coil and a normally closed switch, the lockup coil of each relay being energized in response to a punch indicative pulse from a corresponding one of the column outputs, the clock relay completing a circuit to each of the stepping switches through the normally closed switches of said plurality of relays, whereby the clock relay, when actuated by the row pulses, actuates each of the stepping switches until a punch pulse opens the normally closed switch of the relay associated with a particular stepping switch.

References Cited in the file of this patent

UNITED STATES PATENTS

| | | |
|---|---|---|
| 2,485,663 | Rusch | Oct. 25, 1949 |
| 2,625,822 | Nichols | Jan. 20, 1953 |
| 2,685,084 | Lippel | July 27, 1954 |
| 2,692,377 | Brettel | Oct. 19, 1954 |
| 2,718,634 | Hansen | Sept. 20, 1955 |
| 2,775,754 | Sink | Dec. 25, 1956 |
| 2,807,664 | Kleinberg et al. | Sept. 24, 1957 |